US011854396B2

(12) United States Patent
Shao et al.

(10) Patent No.: US 11,854,396 B2
(45) Date of Patent: Dec. 26, 2023

(54) METHODS AND SYSTEMS FOR MANAGING PARKING LOTS IN SMART CITIES BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Yuefei Wu, Chengdu (CN); Bin Liu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/045,819

(22) Filed: Oct. 11, 2022

(65) Prior Publication Data
US 2023/0067379 A1    Mar. 2, 2023

(30) Foreign Application Priority Data
Sep. 7, 2022 (CN) .......................... 202211087704.8

(51) Int. Cl.
*G08G 1/14* (2006.01)
*G16Y 10/40* (2020.01)

(52) U.S. Cl.
CPC ............. *G08G 1/148* (2013.01); *G16Y 10/40* (2020.01)

(58) Field of Classification Search
None
See application file for complete search history.

(56) References Cited

U.S. PATENT DOCUMENTS

| 2017/0132541 A1* | 5/2017 | Myers | G06F 16/951 |
| 2019/0147368 A1* | 5/2019 | Pinel | G06N 5/022 |
| | | | 706/12 |
| 2020/0090519 A1* | 3/2020 | Ding | G08G 1/168 |

(Continued)

FOREIGN PATENT DOCUMENTS

| CN | 111310987 A | 6/2020 |
| CN | 111932939 A | 11/2020 |

(Continued)

OTHER PUBLICATIONS

First Office Action in Chinese Application No. 202211087704.8 dated Nov. 1, 2022, 23 pages.

(Continued)

*Primary Examiner* — John F Mortell
(74) *Attorney, Agent, or Firm* — METIS IP LLC

(57) ABSTRACT

The present disclosure provides a method for managing a parking lot in a smart city based on an Internet of Things, which is executed by a management platform. The method comprises obtaining a user position of a user platform based on a service platform, determining a candidate parking lot that meets a preset condition; determining time when a vehicle to be parked arrives at the candidate parking lot based on the user position; determining free parking space information when the vehicle to be parked arrives at the candidate parking lot; determining recommendation information based on the free parking space information; and sending the recommendation information to the user platform based on the service platform.

6 Claims, 8 Drawing Sheets

(56) References Cited

U.S. PATENT DOCUMENTS

| | | | |
|---|---|---|---|
| 2020/0242924 A1* | 7/2020 | Publicover | G08G 1/087 |
| 2021/0233405 A1* | 7/2021 | Zhang | G08G 1/141 |
| 2021/0279645 A1* | 9/2021 | Morrow | G06Q 10/02 |
| 2022/0153309 A1 | 5/2022 | Cui et al. | |
| 2022/0178718 A1 | 6/2022 | Xia et al. | |

FOREIGN PATENT DOCUMENTS

| | | |
|---|---|---|
| CN | 112418696 A | 2/2021 |
| CN | 114187775 A | 3/2022 |
| CN | 114390079 A | 4/2022 |
| CN | 114707077 A | 7/2022 |
| CN | 114820960 A | 7/2022 |

OTHER PUBLICATIONS

Notification to Grant Patent Right for Invention in Chinese Application No. 202211087704.8 dated Nov. 18, 2022, 8 pages.

Wang, Kun et al., Research on multi-Pattern Matching Algorithm of "Shared Parking" Parking Spaces, Industrial Control Computer | Ind Contri Comput, 33(10): 74-76, 2020.

Xiong, Gang et al., Big Data Technologies and Intelligent Application System for Urban Transportation, Big Data Research, 2015, 16 pages.

Xing, Jiayuan et al., Real-time Parking Space Detection based on Transfer Learning, Journal of Tianjin University of Technology and Education, 29(4): 32-37, 2019, Dec. 2019.

Li Wei et al., Parking Space Prediction Based on NB-IoT Technology and GA-BP Neural Network, Journal of Nanjing University of Aeronautics & Astronautics, 52(3): 454-459, 2020, Jun. 2020.

\* cited by examiner

400

┌─────────────────────────────────────────────────┐
│ obtaining a preset parking time of currently parked │ ─ 410
│ vehicles in the candidate parking lot collected by an │
│ object platform based on the sensor network platform │
└─────────────────────────────────────────────────┘
                         │
                         ▼
┌─────────────────────────────────────────────────┐
│ determining a delay time of the currently parked vehicle │ ─ 420
│ based on a matching relationship between historical │
│ parking information and current parking information of │
│ the currently parked vehicle │
└─────────────────────────────────────────────────┘
                         │
                         ▼
┌─────────────────────────────────────────────────┐
│ determining the estimated parking time of the currently │ ─ 430
│ parked vehicles based on the preset parking time and the │
│ delay time │
└─────────────────────────────────────────────────┘
                         │
                         ▼
┌─────────────────────────────────────────────────┐
│ determining the free parking space information of the │ ─ 440
│ candidate parking lot when the vehicle to be parked │
│ arrives at the candidate parking lot based on the │
│ estimated parking time of the currently parked vehicles │
└─────────────────────────────────────────────────┘

METHODS AND SYSTEMS FOR MANAGING PARKING LOTS IN SMART CITIES BASED ON THE INTERNET OF THINGS

CROSS-REFERENCE TO RELATED DISCLOSURES

This application claims priority to Chinese Patent Application No. 202211087704.8, filed on Sep. 7, 2022, the entire contents of which are hereby incorporated by reference.

TECHNICAL FIELD

The present disclosure involves the field of parking lot management, and in particular to methods and systems for managing parking lots in smart cities based on the Internet of Things.

BACKGROUND

At present, more and more people choose to drive for travel. With the increase of travel vehicles, free parking space resources of the parking lot are tight, and it usually takes more time to find free parking spaces, which may affect transportation and road vehicle management and also cause inconvenience to users. The Internet of Things is an important part of new generation information technology, which is huge network formed by combining various information sensor devices with network. It may achieve interconnection of people, machines, and things at any time, any place and is of great significance for designing methods and systems for managing parking lots in smart cities.

Therefore, it is hoped to provide a method and system for managing parking lots in a smart city based on the Internet of Things, which may provide users with free parking space information to facilitate users to park vehicles efficiently and improve users' travel experience.

SUMMARY

One or more embodiments of the present disclosure provides a method for managing a parking lot in a smart city based on an Internet of Things, which is executed by a management platform. The method comprises obtaining a user position of a user platform based on a service platform, determining a candidate parking lot that meets a preset condition; determining time when a vehicle to be parked arrives at the candidate parking lot based on the user position; determining free parking space information when the vehicle to be parked arrives at the candidate parking lot; determining recommendation information based on the free parking space information; and sending the recommendation information to the user platform based on the service platform.

One of the embodiments of the present disclosure provides a system for managing a parking lot in a smart city based on an Internet of Things, which includes a user platform, a service platform, and a management platform. The management platform is configured to perform operations including: obtaining a user position of a user platform based on a service platform, determining a candidate parking lot that meets a preset condition; determining time when a vehicle to be parked arrives at the candidate parking lot based on the user position; determining free parking space information when the vehicle to be parked arrives at the candidate parking lot; determining recommendation information based on the free parking space information; and sending the recommendation information to the user platform based on the service platform.

One or more embodiments of the present disclosure provide a non-transitory computer-readable storage medium storing a set of instructions, when executed by at least one processor, causing the at least one processor to implement the above method for managing a parking lot in a smart city based on an Internet of Things.

BRIEF DESCRIPTION OF THE DRAWINGS

The present disclosure will be further described in exemplary embodiments, and these embodiments will be described in detail through the drawings. These embodiments are not restricted. In these embodiments, the same number indicates the same structure, wherein:

FIG. 4 is an exemplary flowchart of determining free parking space information according to some embodiments of the present disclosure;

DETAILED DESCRIPTION

Figure 1:
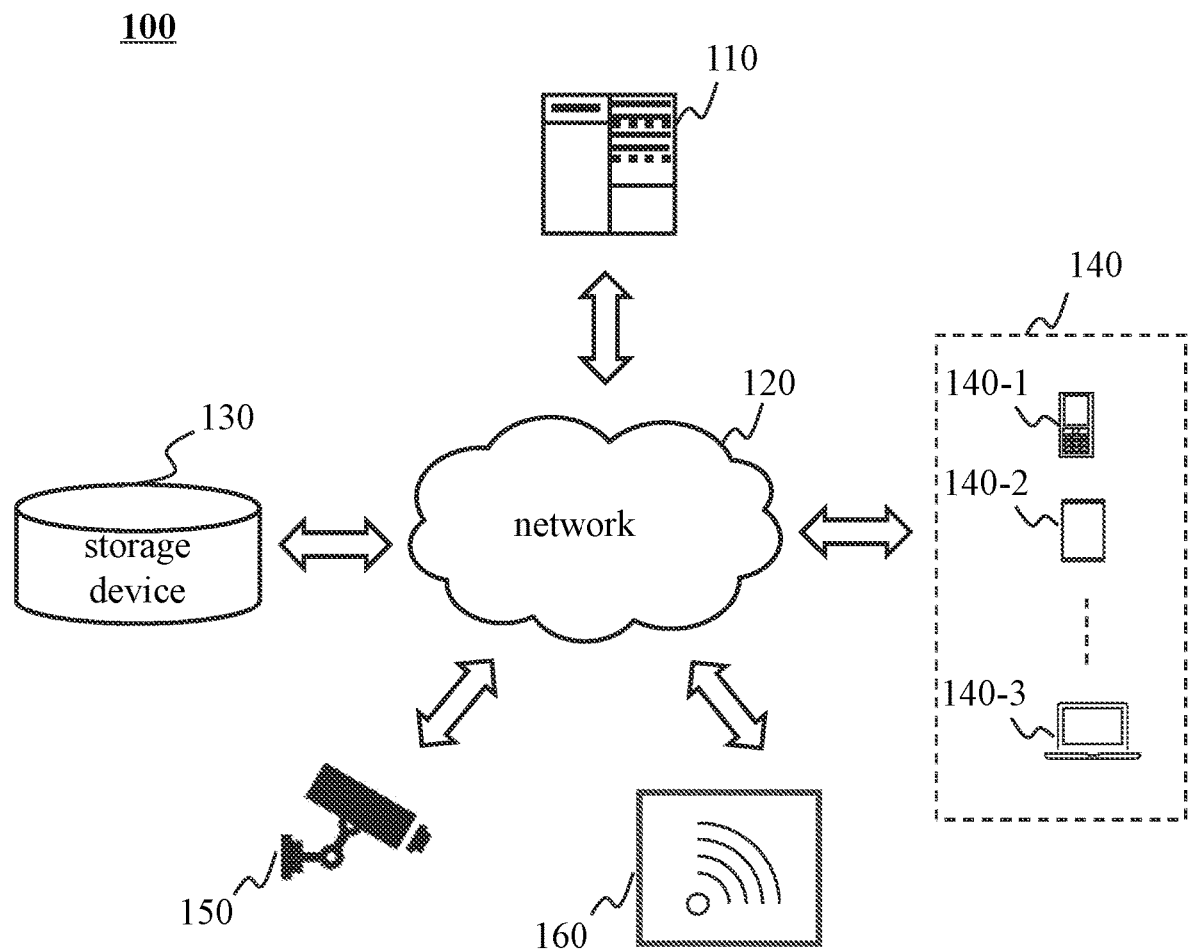
FIG. 1 is a schematic diagram of the application scenario of a system for managing a parking lot in a smart city based on an Internet of Things according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings and on the premise of not paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, if other words may achieve the same purpose, they may be replaced by other expressions.

As shown in the present disclosure and the claims, unless the context clearly suggests exceptional circumstances, the words "a", "an" and/or "the" do not specifically refer to the singular, but may also include the plural, and the plural forms may be intended to include the singular forms as well, unless the context clearly indicates otherwise. In general, the terms "comprise," "comprises," and/or "comprising," "include," "includes," and/or "including" merely prompt to include steps and elements that have been clearly identified, and these steps and elements do not constitute an exclusive listing. The methods or systems may also include other steps or elements.

The flowcharts used in the present disclosure may illustrate operations executed by the system according to embodiments in the present disclosure. It should be understood that the foregoing or following operations may be not necessarily performed exactly in order. Instead, each operation may be processed in reverse or simultaneously. At the same time, other operations may also be added to these processes, or a certain step or several steps may be removed from these processes.

FIG. 1 is a schematic diagram of the application scenario of a system for managing a parking lot in a smart city based on an Internet of Things according to some embodiments of the present disclosure. In some embodiments, the application scenario 100 of the system for managing a parking lot in a smart city based on an Internet of Things may include a processing device 110, network 120, a storage device 130, a user terminal 140, a camera device 150, and a radio frequency induction device 160.

In some embodiments, components in application scenario 100 may be connected and/or communicated with each other through network 120. For example, the processing device 110 may be connected to the storage device 130 through network 120.

The processing device 110 may process information and/or data related to the application scenario 100 of a system for managing a parking lot in a smart city based on an Internet of Things. For example, the processing device 110 may determine the candidate parking lot based on the user position. In some embodiments, the processing device 110 may process data, information and/or processing results obtained from other devices or system components, and execute program instructions based on these data, information and/or processing results to execute one or more function in the present disclosure.

The network 120 may include any suitable network that may promote the information and/or data exchange of the system for managing a parking lot in a smart city based on an Internet of Things. One or more components of the system for managing a parking lot in a smart city based on an Internet of Things may exchange information and/or data through the network 120. For example, the processing device 110 may feedback recommendation information to a user through the network 120.

The storage device 130 may be used to store data, instructions and/or any other information. In some embodiments, the storage device 130 may store data and/or information obtained from processing device 110 and user terminal 140. For example, storage device 130 may store user position information, recommendation information, etc. In some embodiments, the storage device 130 may be set in the processing device 110.

The user terminal 140 may be a terminal device used by users. In some embodiments, the user terminal 140 may include a mobile device 140-1, a tablet 140-2, a laptop 140-3, or the like, or any combination thereof. In some embodiments, the user terminal 140 may be used to input and/or output information and/or data related to the application scenario 100, for example, inputting user positioning information, parking requests, etc., for another example, outputting free parking space information, recommendation information, etc.

The camera device 150 may be a camera device installed in the parking lot, such as a gun camera, an infrared night vision waterproof camera, a ball-type camera or other camera device that may capture a series of video or images. In some embodiments, the camera device 150 may obtain vehicle image information, identify the vehicle plate number to determine the vehicle information. In some embodiments, the camera device 150 may transmit the obtained vehicle information and/data to the processing device 110.

The radio frequency induction device 160 may be used to determine information of vehicles entering and leaving the parking lot. Exemplary radio frequency induction device may include but not limited to Radio Frequency Identification (RFID) device, etc. In some embodiments, radio frequency induction 160 may interact with processing device 110 through the network 120. For example, radio frequency induction device 160 may receive instructions, which are issued by processing device 110, for obtaining data related to the parking lots.

The Internet of Things system is an information processing system that includes all or part of a user platform, a service platform, a management platform, a sensor network platform, the object platform. The user platform is dominant in the Internet of Things operation system. The service platform may provide users with input and output services, which is a bridge of connection between users and management platform. Management platform may coordinate the connection and collaboration between the functional platforms. The sensor network platform may connect management platform and object platform, and plays the function of sensing communication of perceptual information and controlling information. The object platform is a functional platform for generation of perceptual information and execution of controlling information.

The processing of information in the Internet of Things system may be divided into processing of perceptual information and processing controlling information. Controlling information may be information generated based on perceptual information.

In some embodiments, when applying the Internet of Things system to city management, it may be called as the smart city Internet of Things system.

Figure 2:
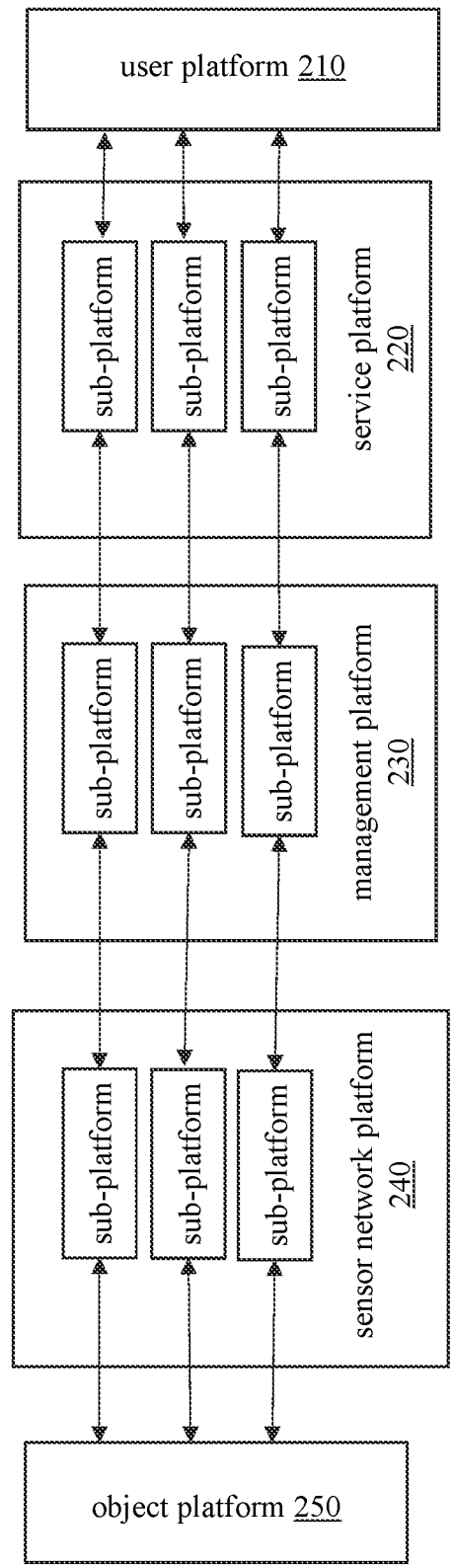
FIG. 2 is an exemplary module diagram of the system for managing a parking lot in a smart city based on an Internet of Things according to some embodiments of the present disclosure.

FIG. 2 is an exemplary module diagram of the system for managing a parking lot in a smart city based on an Internet of Things according to some embodiments of the present disclosure. As shown in FIG. 2, the system 200 for managing a parking lot in a smart city based on an Internet of Things includes a user platform 210, a service platform 220, a management platform 230, a sensor network platform 240, and object platform 250.

In some embodiments, the user platform 210 may be configured as terminal device, and users may receive parking lot management information through the user platform 210. The user platform 210 may interact with the service platform 220. For example, the user platform may send instruction of the user for querying free parking space to the service platform 220, and the user platform may receive free parking space information uploaded by the service platform 220.

In some embodiments, the service platform 220 may be configured as a first server, which is provided with a plurality of service sub-platforms, and the plurality of service sub-platforms correspond to different areas of the city. A plurality of service sub-platforms may process and operate the relevant data of parking lots in each area. For example, vehicle users in the area A may query the free parking space information in the area through service sub-platform AA1 in the area.

The service platform 220 may interact with management platform 230. For example, the service platform 220 may send instruction for querying free parking space to management platform 230, and receive free parking space information uploaded by the management platform 230, etc. The service platform 220 may interact with the user platform 210. For example, the service platform may receive instruction of the user for querying free parking space issued by the user platform 210, and upload free parking space information to the user platform 210.

In some embodiments, the management platform 230 may be configured as a second server. The management platform 230 may be provided with a plurality of management sub-platforms for implementing the method for managing a parking lot in a smart city based on an Internet of Things. The plurality of management sub-platforms may be divided based on city areas, and each management sub-platform corresponds to the service sub-platform one by one.

In some embodiments, the management platform 230 may interact with the sensor network platform 240. For example, the management platform 230 may receive the relevant data of the parking lot uploaded by the sensor network platform 240 for processing, and issue instruction for obtaining relevant data of the parking lot to the sensor network platform 240. In some embodiments, the management platform 230 may interact with the service platform 220. For example, the management platform 230 may receive instruction for querying free parking space issued by the service platform 220, and upload free parking lot information to the service platform 220.

In some embodiments, the management platform 230 is configured to obtain a user position of a user platform based on a service platform, determine a candidate parking lot that meets a preset condition, determine time when a vehicle to be parked arrives at the candidate parking lot based on the user position, determine free parking space information when the vehicle to be parked arrives at the candidate parking lot, determine recommendation information based on the free parking space information, and send the recommendation information to the user platform based on the service platform.

In some embodiments, the management platform 230 is further configured to obtain a preset parking time of currently parked vehicle in the candidate parking lot collected by an object platform based on the sensor network platform, determine a delay time of the currently parked vehicle based on a matching relationship between historical parking information and current parking information of the currently parked vehicle, determine an estimated parking time of the currently parked vehicle based on the preset parking time and the delay time, and determine the free parking space information when the vehicle to be parked arrives at the candidate parking lot based on the estimated parking time of the currently parked vehicle.

In some embodiments, the management platform 230 is further configured to determine a historical vector and a current vector based on the historical parking information and the current parking information of the currently parked vehicle, determine the delay time of the currently parked vehicle through weighting and summing the delay time corresponding to the historical vector with a similarity greater than a similarity threshold based on the similarity of the historical vector and the current vector.

In some embodiments, the management platform 230 is further configured to determine the free parking space information when the vehicle to be parked arrives at the candidate parking lot through processing reference information of the candidate parking lot based on a free parking space prediction model.

In some embodiments, the management platform 230 is further configured to input a parking lot association map into the graph neural network model and determine the free parking space information when the vehicle to be parked arrives at the candidate parking lot based on an output of a node corresponding to the candidate parking lot.

In some embodiments, the management platform 230 is further configured to determine a target sub-map through extracting and filtering a sub-map based on a first map, and determine the popular representation vector through inputting the target sub-map into an extraction model.

In some embodiments, the sensor network platform 240 may be configured as a communication network and gateway. The sensor network platform 240 may be provided with a plurality of sensor network sub-platforms for obtaining relevant data of the parking lot uploaded by the object platform 250. The plurality of the sensor network sub-platforms may be divided based on city areas, and each sensor network sub-platform corresponds to the management sub-platform one by one.

In some embodiments, the sensor network platform 240 may interact with the object platform 250. For example, the sensor network platform 240 may receive the relevant data of the parking lot uploaded by the object platform 250, and issue instructions for obtaining relevant data of the parking lot to the object platform 250. In some embodiments, the sensor network platform 240 may interact with the management platform 230. For example, the sensor network platform 240 may receive the instructions for obtaining relevant data of the parking lot issued by the management platform 230, and upload relevant data of the parking lot to corresponding management sub-platform.

In some embodiments, the object platform 250 may be configured as a monitoring device, such as a camera device, a radio frequency induction device, etc. In some embodiments, the object platform 250 may interact with the sensor network platform 240. For example, the object platform 250 may receive instructions for obtaining relevant data of the parking lot issued by the sensor network sub-platform, and upload the relevant data of the parking lot to corresponding sensor network sub-platform.

The object platform may be configured to obtain the relevant information of the parking lot and transmit the relevant information of the parking lot to a plurality of management sub-platforms through the sensor network platform, so that the plurality of management sub-platforms determine the free parking space information based on the relevant information of the parking lot.

Figure 3:
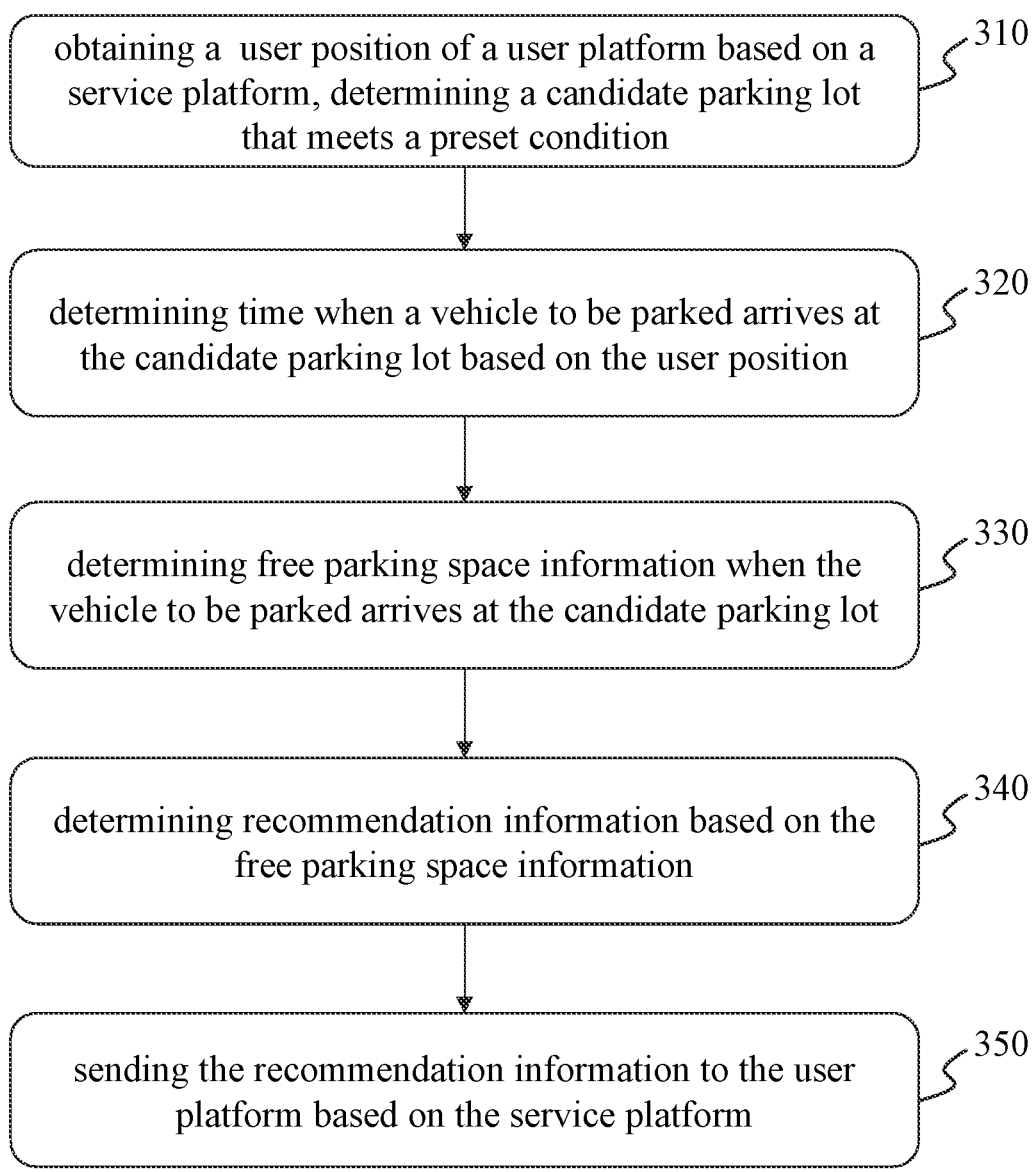
FIG. 3 is an exemplary flowchart of a method for managing a parking lot in a smart city based on an Internet of Things according to some embodiments of the present disclosure.

FIG. 3 is an exemplary flowchart of a method for managing a parking lot in a smart city based on an Internet of Things according to some embodiments of the present disclosure. As shown in FIG. 3, the process 300 includes the following steps. In some embodiments, the process 300 may be performed by the management platform 230.

Step 310, obtaining a user position of a user platform based on a service platform, determining a candidate parking lot that meets a preset condition.

The user position refers to a location where the user drives the vehicle. The user position may be represented by the latitude and longitude, the streets of the area, and the nearby iconic buildings. For example, the user position may be expressed as 39.9 degrees of north latitude and 116.3 degrees of east longitude.

In some embodiments, the user platform may determine the user position through the positioning of the user terminal. For example, the user position may be obtained according to the positioning device such as GPS of the user terminal. In some embodiments, the user position may be determined by an input of user.

The preset condition may include the distance from the parking lot to the user position less than a distance threshold. For example, the preset condition may be that the distance from the parking lot to the current position of the user is within 3 km. In some embodiments, the preset condition may be set by the user or determined through the historical parking lot selected by the user. For example, the historical parking lot selected by the user is a parking lot within 3 km from the current position, so a distance from the current position of the user to a parking lot being within 3 km may be a preset condition.

The candidate parking lot refers to a parking lot that meets the preset condition. For example, for a parking lot A and a parking lot B, the parking lot A meets the preset condition within 3 km from the current position of the user, the parking lot A is a candidate parking lot.

In some embodiments, the management platform may determine a candidate parking lot according to preset condition. For example, if there are a plurality of parking lots from the current position, the distances from the current position to the parking lots are respectively 5 km, 1 km, 1.5 km, and 3.5 km, the parking lot that meets the preset condition that the distance from the current location to the parking lot is within 3 km, i.e., the parking lots with the distance from the current location to the parking lot being 1 km and 1.5 km, may be determined as the candidate parking lots.

Step 320, determining time when a vehicle to be parked arrives at the candidate parking lot based on the user position.

The vehicle to be parked refers to a vehicle that needs to be parked in the parking lot. For example, if a user is driving a vehicle to find a parking lot that may be parked, the management platform may determine the vehicle that the user is driving as a vehicle to be parked.

In some embodiments, the management platform may determine time when a vehicle to be parked arrives at the candidate parking lot in a variety of ways based on the user position. For example, the time when the vehicle to be parked arrives at the candidate parking lot may be determined based on the distance between the user position and the candidate parking lot, and the current vehicle speed. For another example, real-time road traffic conditions may be obtained according to the route plan selected by the user to determine the time when the vehicle to be parked arrives at the candidate parking lot.

Step 330, determining free parking space information when the vehicle to be parked arrives at the candidate parking lot.

Free parking space information refers to the relevant information of the free parking space in the candidate parking lot. Free parking space information may include the number of free parking spaces, the distribution of free parking spaces, and the dynamic changes of free parking spaces. For example, the free parking space information may be that the number of free parking spaces is 20, the free parking space is located in the A5 and B6 areas of the parking lot, and it is expected that the number of free parking spaces may be 15 after 10 minutes.

In some embodiments, the management platform may determine the free parking space information through processing relevant information of the parking lot. For example, the management platform may determine the free parking space information according to the parking time of the currently parked vehicles in the parking lot. For another example, the management platform may also determine free parking space information according to information such as the type of parking lot, the pedestrian flow, or the like. For specific descriptions of the determination of the free parking space information, reference may be made to FIG. 4, FIG. 5, and related contents.

Step 340, determining recommendation information based on the free parking space information.

Recommendation information refers to information related to the recommended candidate parking lot. For example, the recommendation information may include the name of the recommended parking lot, the number of free parking spaces, and the degree of recommendation. The degree of recommendation may be represented by a specific score, or the text "not recommended", "generally recommended", and "very recommended". For example, the recommendation information is that the number of free parking spaces in candidate parking lot A is 30 and a recommendation score is 80.

In some embodiments, the management platform may determine the recommendation information based on the number of free parking spaces. For example, the candidate parking lots with the number of free parking spaces greater than a number threshold may be determined as a recommended parking lot. The number threshold may be preset by the user. In some embodiments, the management platform may determine the recommendation information according to the distribution of the free parking spaces. For example, the degree of recommendation of the candidate parking lots with concentrated distribution of free parking spaces are relatively high.

Step 350, sending the recommendation information to the user platform based on the service platform.

In some embodiments, the management platform may send the recommendation information to the user platform based on the service platform. For example, the recommendation information of different parking lots may be displayed according to the number of free parking spaces from more to less. For another example, the recommendation information may be displayed according to the recommendation score. In some embodiments, when the recommendation information is sent to the user platform, the route planning information to the corresponding parking lot may be sent to the user platform at the same time. For example, when the user clicks on the parking lot corresponding to the recommendation information on the user terminal, the user terminal interface automatically jumps to a map display or navigation interface.

Some embodiments of the present disclosure determine time when a vehicle to be parked arrives at the candidate parking lot based on the user position, and then determined the free parking space information when the vehicle to be parked arrives at the candidate parking lot, which may enable users to know the free parking space information in advance when arriving at the parking lot, avoid users spending a lot of time looking for parking spaces, and improves the speed and accuracy of users looking for parking spaces.

FIG. 4 is an exemplary flowchart of determining free parking space information according to some embodiments of the present disclosure. As shown in FIG. 4, the process 400 includes the following steps. In some embodiments, the process 400 may be performed by the management platform 230.

Step 410, obtaining a preset parking time of currently parked vehicles in the candidate parking lot collected by an object platform based on the sensor network platform.

The currently parked vehicle is a vehicle that has been parked in the candidate parking lot.

The preset parking time refers to the pre-set parking time of the currently parked vehicle. The preset parking time may be represented by time points or time periods. For example, the preset parking time is from 9:00 to 12:00, and the preset parking time is three hours.

In some embodiments, the management platform may determine the preset parking time based on the object platform. For example, the management platform may obtain the historical parking time of the currently parked vehicle collected by the radio frequency induction device, and calculate the average value of the historical parking time as the current preset parking time. For another example, the management platform may obtain the types of other vehicles collected by the camera device and the corresponding historical parking time, and use the historical parking time of other vehicles of the same type as the currently parked vehicle as the preset parking time of the currently parked vehicle.

Step 420, determining a delay time of the currently parked vehicle based on a matching relationship between historical parking information and current parking information of the currently parked vehicle.

Historical parking information refers to the historical parking information of the currently parked vehicle in the parking lot. History parking information may include the type of parking lot (e.g., open-air, underground, sides of the road, residential parking lots, shopping mall parking lots, etc.), the type of parking date (e.g., working day or holiday), the type of parking time (e.g., morning, afternoon, late night, early morning, etc.), preset parking time, or the like.

The current parking information refers to the current parking information of the currently parked vehicle in the parking lot. The current parking information may include the type of parking lot, the type of parking date, the type of parking time period, the preset parking time, or the like.

The matching relationship refers to information related to whether the historical parking information matches the current parking information. In some embodiments, the matching relationship may be represented by the degree of matching. The degree of matching may be represented by numbers and/or text.

In some embodiments, the management platform may determine the matching relationship based on the similarity of the historical parking information and the current parking information of the currently parked vehicle. For example, the management platform determines that the matching relationship is 100% of the degree of the matching based on the information in historical parking information and current parking information being all the same.

The delay time refers to time when the parking time of the currently parked vehicle exceeds the preset parking time. For example, if the parking time of the currently parked vehicle is 8 hours and the preset parking time is 5 hours, the delay time is 3 hours. The delay time may be represented by time points or time periods. For example, the delay time is from 9:00 to 12:00, and the delay time is three hours.

In some embodiments, the management platform may analyze and processes the matching relationship between historical parking information and current parking information of the currently parked vehicle to determine the delay time of the currently parked vehicle. For example, the management platform may establish a comparison table of matching relationships and delay time, and the corresponding delay time may be obtained by querying the comparison table based on the matching relationship.

In some embodiments, the management platform may determine the historical vector and the current vector based on the historical parking information and the current parking information of the currently parked vehicle.

Historical vector refers to a vector corresponding to historical parking information. In some embodiments, the management platform may build a historical vector based on historical parking information. For example, the management platform may build a historical vector $\vec{a}=(c, d, e, f)$ based on the contents of historical parking information, where c represents the type of parking lot, d represents the type of parking date, e represents the type of parking time, f represents preset parking time. For example, vector $\vec{a}=$(open-air parking lot, holiday, morning, 3 hours) indicates that the type of parking is open-air parking lot, the type of parking date is holiday, the type of parking time is morning, the preset parking time is 3 hours.

The current vector refers to the current vector corresponding to the current parking information. In some embodiments, the management platform may build a current vector according to the current parking information. For example, the management platform may build a current vector $\vec{b}=(j, k, m, n)$ based on the contents of the current parking information, where j represents the type of parking lot, k represents the type of parking date, m represents the type of parking time, n represents the preset parking time. For example, vector $\vec{b}=$(open-air parking lot, holiday, afternoon, 5 hours) indicates that the type of parking lot is open-air parking lot, the type of parking date type is holiday, the type of parking time is afternoon, preset parking time is 5 hours.

In some embodiments, the management platform may determine the delay time of the currently parked vehicle through weighting and summing the delay time corresponding to the historical vector with a similarity greater than a similarity threshold based on the similarity of the historical vector and the current vector. The similarity threshold may be set based on experience.

Similarity refers to the degree of similarity between historical vector and current vector. In some embodiments, the management platform may calculate the distance between the historical vector and the current vector, and determine the similarity based on the vector distance. Exemplary vector distance may include the cosine distance, the Euclidean distance, the Hamming distance, etc. Similarity may be represented by value, for example, similarity is 80%.

In some embodiments, when weighting and summing the delay time corresponding to the historical vector with a similarity greater than a similarity threshold, the management platform may determine the weight of the historical vector based on the similarity between the historical vector and the current vector. For example, the historical vector with a similarity greater than a similarity threshold includes the historical vector $\vec{a1}$ with a similarity of 90%, and the historical vector $\vec{a2}$ with a similarity of 70%. The management platform may determine the weight of the historical vector $\vec{a1}$ as 56.25% based on operation including: similarity of historical vector $\vec{a1}$/(similarity of historical vector $\vec{a1}$+similarity of historical vector $\vec{a2}$).

In some embodiments, when weighting and summing the delay time corresponding to the historical vector with a similarity greater than a similarity threshold, the management platform may calculate the similarity based on the popular representation vector of the candidate parking lot corresponding to the historical vector with the similarity greater than the similarity threshold and the current popular representation vector of the candidate parking lot, and use the similarity as a weight. For example, historical vector with the similarity greater than the similarity threshold includes the historical vector $\vec{a1}$, the popular representation vector of the corresponding candidate parking lot is $\vec{a-1}$. The current popular representation vector of the candidate parking lot is $\vec{b-1}$. The management platform may calculate the similarity of the above two popular representation vectors, and determine the calculation result as the weight of the history vector $\vec{a1}$. The calculated similarity may be determined based on the vector distance. Exemplary vector distances may include cosine distances, Euclidean distances, Hamming distances, or the like. Similarity may be expressed numerically.

Popular representation vector refers to the popularity of the parking lot. The popular representation vector may include information such as the pedestrian flow and score of the parking lot. The higher the popularity of the parking lot is, the greater the pedestrian flow is and the higher the score is. In some embodiments, the popular representation vector may be obtained based on the extraction model. For more explanations about the popular representation vector, see FIG. 7 and its related contents.

The delay time is determine based on the similarity of the vectors corresponding to historical parking information and current parking information of the currently parked vehicle, which may improve the accuracy of determining the delay time and be conducive to accurately determining the free parking space information.

Step 430, determining the estimated parking time of the currently parked vehicles based on the preset parking time and the delay time.

Estimated parking time refers to the estimated time of a currently parked vehicle from entering the parking lot to leaving the parking lot. For example, when the vehicle enters the parking lot at nine o'clock, it is estimated that the vehicle leaves the parking lot at twelve o'clock, and the estimated time is three hours.

In some embodiments, the management platform may take a sum of the preset parking time and the delay time as the estimated parking time for the currently parked vehicle. For example, the preset parking time is 3 hours and the delay time is 1.5 hours, and the estimated parking time may be calculated to be 4.5 hours.

Step 440, determining the free parking space information of the candidate parking lot when the vehicle to be parked arrives at the candidate parking lot based on the estimated parking time of the currently parked vehicles.

In some embodiments, the management platform may determine the free parking space information of the candidate parking lot when the vehicle to be parked arrives at the candidate parking lot based on the estimated parking time of the currently parked vehicles. For example, the management platform may determine the number and distribution of free parking spaces in the parking lot according to the estimated parking time of each vehicle when user arrive at the parking lot. For another example, the management platform may determine the real-time changes in the number of free parking spaces in the parking lot based on the estimated parking time of each vehicle, and the number of free parking spaces in the future time may be estimated.

Figure 5:
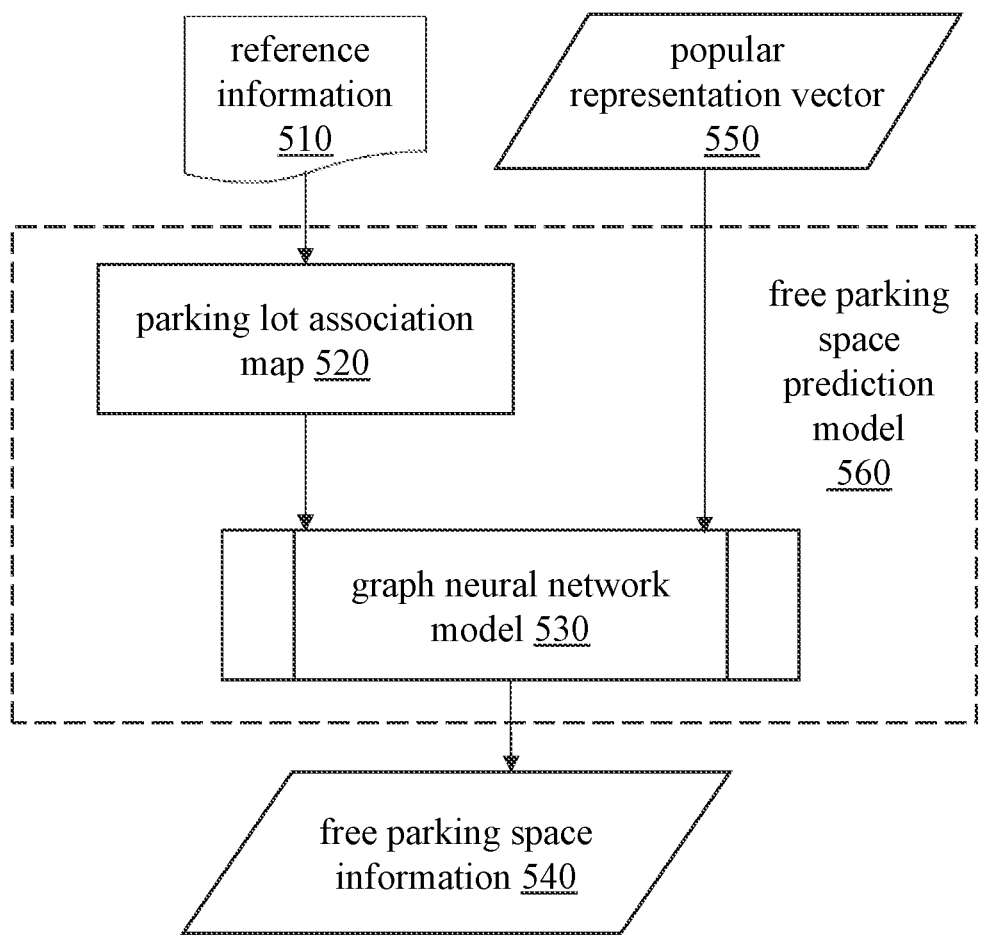
FIG. 5 is an exemplary schematic diagram of a method for determining free parking space information according to some embodiments of the present disclosure.

Some embodiments of the present disclosure determine the estimated parking time of the currently parked vehicles based on the preset parking time and the delay time, and then determine the free parking space information when the vehicle arrives at the candidate parking lot, which considers that some vehicles may park overtime, the accuracy of determining free parking space information is improved FIG. 5 is an exemplary schematic diagram of a method of determining free parking space information according to some embodiments of the present disclosure. As shown in FIG. 5, the process 500 of a method of determining the free parking space information includes follow contents.

In some embodiments, the management platform may process reference information of the candidate parking lot based on a free parking space prediction model to determine the free parking space information when the vehicle to be parked arrives at the candidate parking lot. As shown in FIG. 5, the management platform may input reference information 510 to the free parking space prediction model 560 for processing and the free parking space prediction model 560 outputs the free parking space information 540.

Reference information refers to information related to the candidate parking lot for determining the free parking space information. For example, the location of the parking lot, the total number of parking spaces, etc. In some embodiments, the reference information may include at least one of basic information of the candidate parking lot, a current parking ratio, and the current pedestrian flow of the nearby place.

The basic information of the candidate parking lot refers to information related to the candidate parking lot, such as location of the parking lot, type of the parking lot, the total number of parking spaces in the parking lot, etc.

The current parking ratio refers to the ratio of the number of parking spaces of currently parked vehicles to the total number of parking spaces in the parking lot.

The current pedestrian flow of nearby places refers to the pedestrian flow of the places within the preset range of the candidate parking lot at the current moment.

In some embodiments, the management platform may determine the reference information of the candidate parking lot by processing the information from object platform. For example, the management platform may analyze and process the image collected by object platform through various feasible methods to determine the reference information of the candidate parking lot.

In some embodiments, the management platform may determine the reference information of the candidate parking lot through other methods, for example, manual input, historical data, etc.

The free parking space prediction model may be a trained machine learning model. The free parking space prediction model may include any one or combination of a circulating neural network model, a deep neural network model, a convolutional neural network model, etc.

The input of the free parking space prediction model may be reference information, and the output of the free parking space prediction model may be free parking space information.

In some embodiments, the management platform may determine a free parking place prediction model through training a plurality of groups of training samples and labels. Training samples include sample reference information. Sample reference information may be derived from historical reference information of various parking lots, such as at least one of the historical basic information, the historical parking ratio, and the historical pedestrian flow of nearby places. The label is sample free parking space information. The label may be derived from historical free parking space information corresponding to each parking lot, or may be determined by manually marking.

During the training process, the management platform may build a loss function based on the label and outputs of the initial free parking space prediction model. Based on the loss function, the parameters of the free parking space prediction model are updated through the gradient decrease or other methods. When the preset conditions are met, the model training is completed, and the trained free parking space prediction model is obtained. The preset condition may be that the loss function converges, the number of iterations reaches a number threshold, etc.

In some embodiments, the free parking space prediction model may include a graph neural network model.

In some embodiments, the management platform may input the parking lot association map input the graph neural network model. Based on the output of the nodes corresponding to the candidate parking lot, the free parking space information of the candidate parking lot when the vehicle to be parked arrives at the candidate parking lot may be determined. As shown in FIG. 5, the management platform may input parking lot association map 520 to the graph neural network model 530, and use the graph neural network model 530 to deal with the parking lot association map 520 to determine the free parking space information 540.

The parking lot association map may reflect the feature of the candidate parking lot and the nearby place, as well as the relationship between the candidate parking lot and the nearby place.

In some embodiments, the parking lot association map may be obtained based on the reference information of the candidate parking lot. In some embodiments, the parking lot association map may be updated dynamically. For example, a parking lot association map that has been built may be updated (e.g., increase, delete, etc.) according to different situations (such as building a new parking lot).

The parking lot association map may include nodes and edges. In some embodiments, nodes may include candidate parking lot nodes and nearby place nodes. In some embodiments, the feature of candidate parking nodes includes the basic information of the candidate parking lot and the current parking ratio. In some embodiments, the feature of nearby place includes the type of nearby place and the current pedestrian flow of nearby place. The type of nearby place may be determined based on manual input. As shown in parking lot association map 600 of FIG. 6, candidate parking lot nodes include a parking lot 1, a parking lot 2, a parking lot 3 and a parking lot 4; and nearby place nodes include a place A, a place B, and a place C. The feature of parking lot 1 may include basic information 630 and current parking ratio 640, and feature of the place A may include the type 650 and the current pedestrian flow 660.

Figure 6:
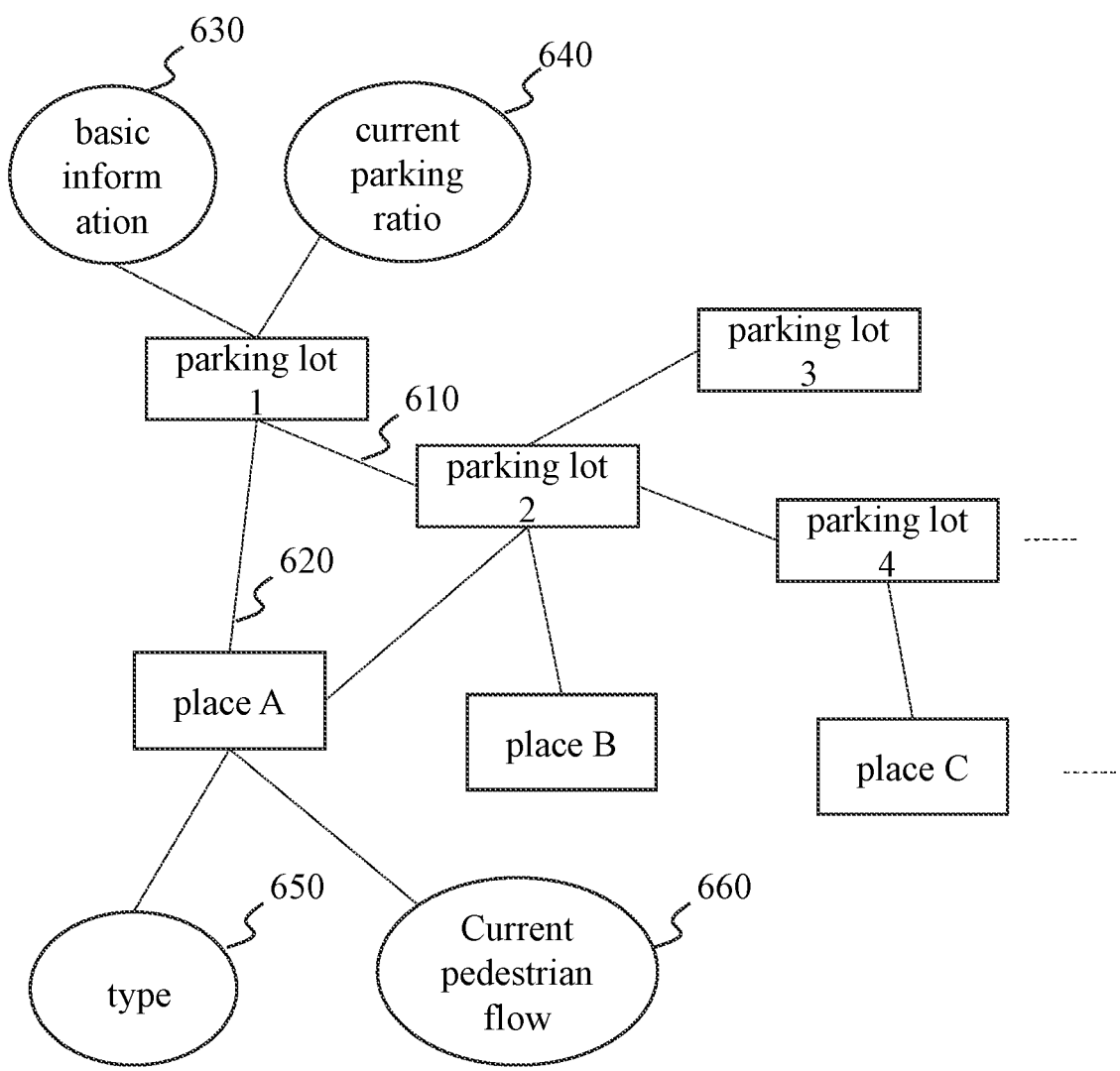
FIG. 6 is an exemplary schematic diagram of a parking lot association map according to some embodiments of the present disclosure.

In some embodiments, edges of the parking lot association map may be used for interconnection of the candidate parking lot nodes which satisfy a first preset condition and connection of the candidate parking lot nodes which satisfy a first preset condition and the nearby place nodes. As shown in FIG. 6, the edge 610 may be used for connection between the parking lot 1 and the parking lot 2, and the edge 620 may be used for the connection of the parking lot 1 and the place A. The first preset condition may include a distance between two places less than a distance threshold. For example, the distance between the parking lot 1 and the place A is less than the distance threshold, and the distance threshold may be set according to experience.

In some embodiments, feature of the edge is a distance between the candidate parking lots corresponding to the candidate parking lot nodes, or a distance between the candidate parking lot corresponding to the candidate parking lot nodes and the nearby place corresponding to the nearby place nodes. For example, the feature of edge 610 is the distance between the parking lot 1 and the parking lot 2, such as 3 km. For another example, the feature of edge 620 is the distance between the parking lot 1 and the place A, such as 1 km. The distance may be obtained based on various methods such as historical data and manual input.

In some embodiments, the graph neural network model may be trained based on training samples and labels. The training sample includes a sample parking lot association map, and the training sample may be obtained based on the historical reference information of each parking lot. The label of the training sample is sample free parking space information. The label may be derived from the historical free parking space information corresponding to each parking lot or may also be determined through manually labeling.

When training the initial graph neural network model, the management platform builds a loss function based on the label of the training sample and the output of the initial graph neural network model, and iteratively updates the parameters of the graph neural network model based on the loss function until satisfying a preset condition, and the trained graph neural network model is obtained. The preset condition may be that the loss function is smaller than a threshold, converges, or the training period reaches the threshold.

Building a parking lot association map based on a variety of information may better represent the relationship between the information; using the graph neural network model to process the parking lot association map may make the output result more accurate.

In some embodiments, the input of the graph neural network model also includes the popular representation vector of the candidate parking lot, and the popular representation vector of the candidate parking lot is the feature of the candidate parking lot node. As shown in FIG. 5, the input of the graph neural network model 530 also includes the popular representation vector 550.

Figure 7:
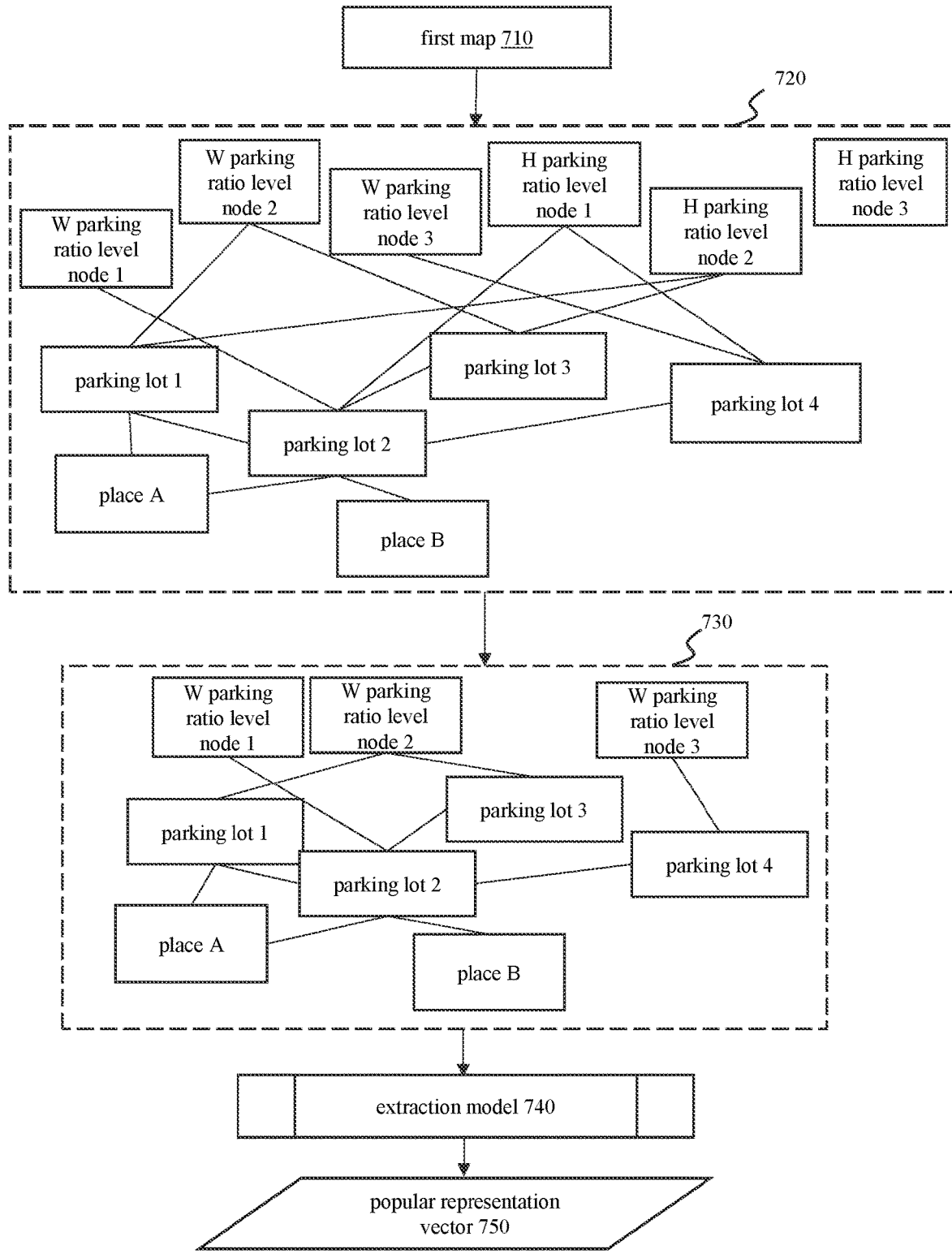
FIG. 7 is an exemplary schematic diagram for determining a popular representation vector according to some embodiments of the present disclosure.

For more explanations of the popular representation vector, see FIG. 7 and its related contents.

The training of the graph neural network model may be carried out by the above training method of the neural network model. Training samples include sample parking lots association map and sample popular representation vector. The sample popular representation vector may be derived from the historical popular representation vector of each parking lot, its label is free parking space information. The label may be derived from the historical free parking space information corresponding to each parking lot or may also be determined by manually labeling.

The popular representation vector of the candidate parking lot is inputted into the graph neural network model, since the popularity of the parking lot may reflect the parking time to a certain extent, for example, if the parking lot is popular, the parking time of the vehicle may be longer, therefore, the accuracy of determining the free parking space information may be further improved.

Some embodiments of the present disclosure determine the free parking space information through the free parking space prediction model, which may reduce the amount of calculation and improve the speed and accuracy of determination.

FIG. 7 is an exemplary schematic diagram of popular representation vector according to some embodiments of the present disclosure. As shown in FIG. 7, the process 700 of determining popular vector may include follow contents.

In some embodiments, the management platform may determine a target sub-map through extracting and filtering a sub-map based on a first map. As shown in FIG. 7, the management platform may determine the target sub-map 730 through extracting and filtering a sub-map 720 based on a first map 710.

The first map may reflect the feature of the candidate parking lot, nearby places, and parking ratio level and the relationship among them.

The first map may include nodes and edges. In some embodiments, the nodes may include candidate parking lot nodes, nearby place nodes, and parking space ratio level nodes.

Figure 8:
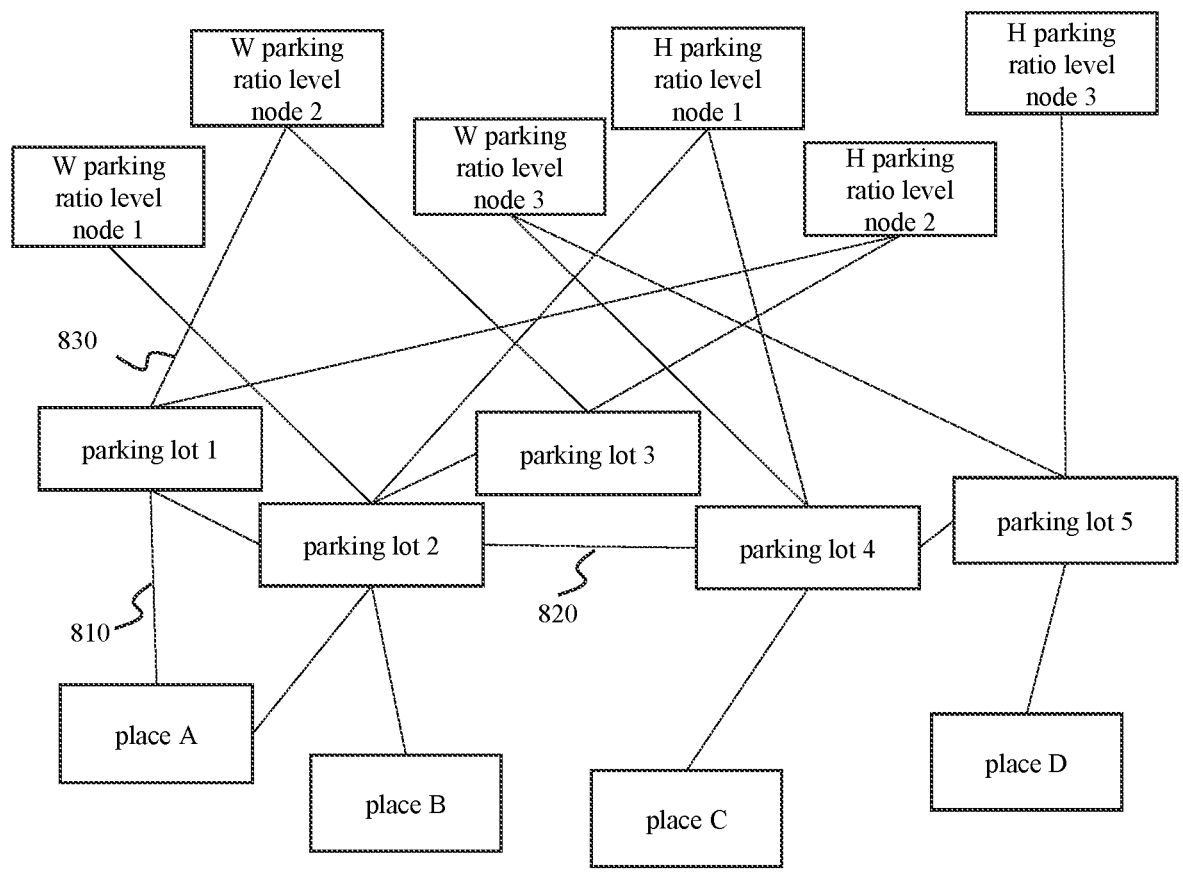
FIG. 8 is an exemplary schematic diagram of a first map according to some embodiments of the present disclosure.

As shown in first map 800 of FIG. 8, candidate parking lot nodes include a parking lot 1, a parking lot 2, a parking lot 3, a parking lot 4 and a parking lot 5. Near place nodes include a place A, a place B, a place C, and a place D. In some embodiments, the parking ratio level nodes may be divided into weekday parking ratio level nodes (hereinafter described as W parking ratio level nodes) and holiday parking ratio level nodes (hereinafter described as H parking ratio level nodes). For example, FIG. 8 shows that W parking ratio level nodes include W parking ratio level node 1, W parking ratio level node 2, and W parking ratio level node 3, H parking ratio level nodes include H parking ratio level node 1, H parking ratio level node 2 and H parking ratio level node 3.

Weekday and holiday parking ratio refers to the ratio of the number of vehicles in the candidate parking lot to the total number of parking spaces on weekdays and holidays, parking ratio may be expressed as percentage. Weekday parking ratio level and holiday parking ratio level refer to the level corresponding to the parking ratio on weekday and the parking ratio on holidays, which may be represented by Arabic numerals.

In some embodiments, the management platform may obtain weekday parking ratio level and holiday parking ratio level based on object platform. For example, the management platform may calculate weekday parking ratio and holiday parking ratio based on the images collected by object platform, and preset comparison relationship of parking ratio and parking ratio level. For example, the weekday parking ratio level may be preset as 1-3, 0-30%, 30%-60%, 60%-100% of weekday parking ratio correspond to weekday parking ratio level 1, level 2, and level 3, respectively. The management platform may also obtain weekday parking ratio level and holiday parking ratio level in other ways, for example, historical data, manual input, etc.

In some embodiments, the feature of the candidate parking lot nodes may include a total number of parking spaces, a number of currently occupied parking spaces, and a currently occupied parking space ratio, a type of a parking lot. In some embodiments, the feature of the candidate parking node may also include the parking time features of parking space of the candidate parking lot. In some embodiments, the parking time feature of the parking space of the candidate parking lot may be determined based on a preset parking time, or a delay time, or an estimated parking time. For example, the parking time feature may be determined based on a preset parking time, or a delay time, or an estimated parking time of a parking space in the candidate parking lot. For another example, the parking time feature may be determined based on the sum of parking time, the sum of the delay time, or the sum of estimated parking time for all parking spaces in the candidate parking lot.

In some embodiments, the feature of the nearby place nodes may include a type of the nearby place, an average pedestrian flow level on weekdays, and an average pedestrian flow level on holidays. Management platforms may determine the average pedestrian flow level on weekdays and average pedestrian flow level on holiday through various feasible ways, for example, historical data, manually input, etc.

In some embodiments, the feature of the parking ratio level may include the value corresponding to the parking ratio level. The management platform may obtain the value corresponding to the parking ratio by manually presetting, or may be obtained based on historical data.

In some embodiments, the edge of the first map may be used for interconnection of the candidate parking lot nodes that meet the first preset condition and connection between the candidate parking lot node that meet the first preset condition and the nearby place nodes. The edge of the first map may further be used for the connection between the candidate parking lot node that satisfies a second preset condition and the parking ratio level node. For the descriptions of the first preset condition, please refer to the relevant contents of the parking lot association map. The second preset condition may include that parking situation of the candidate parking lot meets a parking ratio level.

As shown in FIG. 8, there is an edge 810 between a parking lot 1 and a place A, and an edge 820 between a parking lot 2 and a parking lot 4, indicating that the distance between the parking lot 1 and the place A satisfies the first preset condition. The distance between the parking lot 2 and the parking lot 4 satisfies the first preset condition. There is an edge 830 between the parking lot 1 and the W parking ratio level node 2, indicating that the parking situation of the parking lot 1 meets the parking ratio level of the W parking ratio level node 2.

In some embodiments, the management platform may build the first map through various feasible methods based on the reference information of the candidate parking lot.

The sub-map is a map obtained after filtering the first map. The sub-map includes nodes and edges. The nodes and edges of the sub-maps and their respective features may refer to the related contents of the first map.

In some embodiments, the management platform may extract the sub-map based on the first map. For example, management platform may filter the first map based on the proximity between a parking lot node and other nodes in the first map, remove parking lot node, nearby place node and related edge that do not satisfy the proximity requirement, and use the filtered map as a sub-map. The proximity may refer to a near far relationship between the two nodes. For example, proximity may include 1, 2, 5, etc. The proximity of 1 means two nodes directly connected with each other. The proximity of 2 means that the two nodes are connected through one of the other nodes. As shown in FIG. 8, the proximity between node of parking lot 1 and node of parking lot 2 is 1, and the proximity between node of parking lot 1 and node of place B is 2.

As shown in FIG. 7, the management platform may remove parking lot node, nearby place node and related edge whose proximity is greater than 2 based on node of parking lot 1 in FIG. 8, and use the filtered map as sub-map 720. The sub-map 720 may be called a sub-map of the parking lot 1. The proximity of the parking lot 5, the place C, the place D, and the parking lot 1 are greater than 2, so these nodes and the edges connected to the nodes are filtered. The above steps are performed for other parking lots to obtain the sub-map of each parking lot.

The target sub-map is a map obtained after filtering the sub-map. The sub-map includes nodes and edges. The nodes and edges of the sub-map and their respective features may refer to the related contents of the first map.

In some embodiments, the management platform may filter sub-map to obtain a target sub-map. For example, the management platform may filter the sub-map based on the current time type, remove the parking ratio level node and connected edge that are not corresponding to the time type, and then obtain the target sub-map. As shown in FIG. 7, the target sub-map 730 is the sub-map obtained after filtering the sub-map 720. Because the current time type is a weekday, the holiday parking ratio node and the edges connected to them are filtered.

In some embodiments, the management platform may input the target sub-map into an extraction model to determine the popular representation vector. As shown in FIG. 7, the management platform may input the target sub-map 730 into the extraction model 740 to determine popular representation vector 750.

The extraction model is the trained machine learning model. The extraction model may include any one or a combination of a recurrent neural network model, a convolutional neural network, or other custom model structures, etc.

The input of the extraction model may be the target sub-map and the output of the extraction model may be popular representation vector.

In some embodiments, the extraction model may be obtained based on joint training with the similarity judgment model.

The similarity judgment model is a machine learning model. The similarity judgment model is used to determine the similarity of two popular representation vectors. The input of the similarity judgment model may be two target sub-maps. The output of the similarity judgment model may be the similarity of the two popular representation vectors.

In some embodiments, the similarity judgment model may include two vector extraction layers and a similarity judgment layer. The vector extraction layer is used to extract popular representation vector. Two target sub-maps are inputted into the two extraction layers separately, and the two extraction layers output their own popular representation vectors separately. The similarity judgment layer is used to determine the similarity of the two popular representation vectors. The input of the similarity judgment layer is two popular representation vectors, and the output of the similarity judgment layer is the similarity of the two popular representation vectors. That is, the input of the similarity judgment model is the input of the two vector extraction layers, and the output of the similarity judgment layer is the output of the similarity judgment model.

In some embodiments, the management platform may train vector extraction layers and similarity judgment layer based on a large number of label training data. The training samples are the historical target sub-maps extracted from pairs of parking lots whose distances are less than a distance threshold in the same time period. The label is the similarity of the historical popularity representation vectors determined by multiple pairs of the parking lot in the same time period. The label may be derived from historical data, or may be obtained by manual labeling. Specifically, training sample may be inputted into the vector extraction layer, that is, the historical target sub-maps extracted from pairs of parking lots whose distances are less than a distance threshold in the same time period are inputted into the vector extraction layer, pairs of the historical popular representation vector may be outputted. Then the pairs of the historical popular representation vector are inputted into the similarity judgment layer to obtain a plurality of similarities of the historical popular representation vectors determined by multiple pairs of parking lots in the same time period outputted by the similarity judgment layer. The parameters of the initial vector extraction layer and the initial similarity judgment layer are updated through training. When the trained intermediate vector extraction layer and intermediate similarity judgment layer meet the preset conditions, the trained vector extraction layer and similarity judgment layer are obtained, and the trained vector extraction layer are used as the extraction model. The preset condition may be that the loss function is smaller than the threshold, converges, or the training period reaches the threshold.

Some embodiments of the present disclosure extract the sub-map based on first map, and filter the sub-map to determine a target sub-map, which may obtain different target sub-maps according to different needs. The popular representation vector is determined by the extraction model, which may reduce the calculation amount and improve the speed and accuracy of the determination.

The basic concepts have been described above, apparently, for those skilled in the art, the above-mentioned detailed disclosure is only used as an example, and it does not constitute a limitation of the present disclosure Various alterations, improvements, and modifications may occur and are intended to those skilled in the art, though not expressly stated herein. Such modifications, improvements, and corrections are suggested in the present disclosure, so such modifications, improvements, and corrections still belong to the spirit and scope of the exemplary embodiments of the present disclosure.

At the same time, this specification uses specific words to describe the embodiments of the present specification. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this disclosure are not necessarily all referring to the same embodiment. Further, certain features, structures, or features of one or more embodiments of the present disclosure may be combined.

Moreover, unless otherwise specified in the claims, the sequence of this specification, the order of the sequence of the present specification, the use of digital letters, or other names are not used to define the order of the present specification processes and methods. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combination s that are within the spirit and scope of the embodiments of the present disclosure. For example, although the system components described above may be implemented by hardware devices, they may also be implemented by software-only solutions, such as installing the described systems on existing servers or mobile devices.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

Finally, it should be understood that the embodiments described in the present disclosure are intended to illustrate the principles of the embodiments of the present disclosure. Other variations may also fall within the scope of the present disclosure. Therefore, merely by way of example and not limitation, alternative configurations of the embodiments of the present disclosure may be considered consistent with the teachings of the present disclosure. Accordingly, embodiments of the present application are not limited to that precisely as shown and described.

What is claimed is:

1. A method for managing a parking lot in a smart city based on an Internet of Things, which is executed by a management platform, the method comprising:

obtaining a user position of a user platform based on a service platform, determining a candidate parking lot that meets a preset condition;

determining time when a vehicle to be parked arrives at the candidate parking lot based on the user position;

determining, through processing a parking lot association map based on a graph neural network model, free parking space information when the vehicle to be parked arrives at the candidate parking lot; wherein the parking lot association map includes nodes and edges, nodes of the parking lot association map include candidate parking lot nodes and nearby place nodes, feature of the candidate parking lot nodes includes information of the candidate parking lot, the current parking ratio and a representation vector of the candidate parking lot; wherein the representation vector includes a pedestrian flow and a score of the candidate parking lot; feature of the nearby place nodes includes a type of the nearby place, and the current pedestrian flow in the nearby place; and edges of the parking lot association map are used for interconnection of the candidate parking lot nodes which satisfy a first preset condition and connection of the candidate parking lot nodes which satisfy a first preset condition and the nearby place nodes;

a manner for determining the representation vector including:

removing the candidate parking lot nodes and the nearby place nodes and associated edges that do not meet a proximity requirement to obtain a sub-map through filtering based on the proximity between the candidate parking lot nodes and other nodes of a first map; nodes of the first map include the candidate parking lot nodes, the nearby place nodes, and the parking ratio level nodes; the feature of the candidate parking lot nodes in the first map further includes a parking time feature of parking space of the candidate parking lot; and the edges of the first map are further used for the connection between the candidate parking lot node that satisfies a second preset condition and the parking ratio level node;

removing the parking ratio level nodes and connected edges that do not correspond to a type of time to obtain a target sub-map through filtering the sub-map based on a type of current time, wherein the type of time includes weekday and holiday;

determining the representation vector through inputting the target sub-map into an extraction model; wherein the extraction model is obtained based on training a similarity judgment model, the similarity judgment model includes two vector extraction layers and a similarity judgment layer, and the trained vector extraction layer is used as the extraction model;

determining recommendation information based on the free parking space information; and sending the recommendation information to the user platform based on the service platform.

2. The method of claim 1, wherein the service platform includes a plurality of service sub-platforms, different service sub-platforms corresponding to different areas;

the management platform includes a plurality of management sub-platforms, different management sub-platforms corresponding to the different areas; and the sensor network platform includes a plurality of sensor network sub-platforms, different sensor network sub-platforms corresponding to the different areas, the service sub-platforms corresponding to the management sub-platforms one by one, and the management sub-platforms correspond to the sensor network sub-platforms one by one.

3. The method of claim 1, wherein the determining free parking space information when the vehicle to be parked arrives at the candidate parking lot includes:

obtaining a preset parking time of currently parked vehicles in the candidate parking lot collected by an object platform based on the sensor network platform;

determining a delay time of the currently parked vehicle based on a matching relationship between historical parking information and current parking information of the currently parked vehicle;

determining an estimated parking time of the currently parked vehicle based on the preset parking time and the delay time; and determining the free parking space information when the vehicle to be parked arrives at the candidate parking lot based on the estimated parking time of the currently parked vehicle.

4. A system for managing a parking lot in a smart city based on an Internet of Things, further comprising a user platform, a service platform, and a management platform, wherein the management platform is configured to perform operations including:

obtaining a user position of the user platform based on the service platform, determining a candidate parking lot that meets a preset condition;

determining time when a vehicle to be parked arrives at the candidate parking lot based on the user position;

determining, through processing a parking lot association map based on a graph neural network model, free parking space information when the vehicle to be parked arrives at the candidate parking lot; wherein the parking lot association map includes nodes and edges, nodes of the parking lot association map include candidate parking lot nodes and nearby place nodes, feature of the candidate parking lot nodes includes information of the candidate parking lot, the current parking ratio and representation vector of the candidate parking lot; wherein the representation vector includes a pedestrian flow and a score of the candidate parking lot; feature of the nearby place nodes includes a type of the nearby place, and the current pedestrian flow in the nearby place; and edges of the parking lot association map are used for interconnection of the candidate parking lot nodes which satisfy a first preset condition and connection of the candidate parking lot nodes which satisfy a first preset condition and the nearby place nodes;

a manner for determining the representation vector including:

removing the candidate parking lot nodes and the nearby place nodes and associated edges that do not meet a proximity requirement to obtain a sub-map through filtering based on the proximity between the candidate parking lot nodes and other nodes of a first map; nodes of the first map include the candidate parking lot nodes, the nearby place nodes, and the parking ratio level nodes; the feature of the candidate parking lot nodes in the first map further includes: a parking time feature of parking space of the candidate parking lot; and the edges of the first map are further used for the connection between the candidate parking lot node that satisfies a second preset condition and the parking ratio level node;

removing the parking ratio level nodes and connected edges that do not correspond to a type of time to obtain a target sub-map through filtering the sub-map based on a type of current time, wherein the type of time includes weekday and holiday;

determining the representation vector through inputting the target sub-map into an extraction model; wherein the extraction model is obtained based on training a similarity judgment model, the similarity judgment model includes two vector extraction layers and a similarity judgment layer, and the trained vector extraction layer is used as the extraction model;

determining recommendation information based on the free parking space information; and sending the recommendation information to the user platform based on the service platform.

5. The system of claim 4, further comprising a sensor network platform, wherein the service platform includes a plurality of service sub-platforms, different service sub-platforms corresponding to different areas;

the management platform includes a plurality of management sub-platforms, different management sub-platforms corresponding to the different areas;

the sensor network platform includes a plurality of sensor network sub-platforms, different sensor network sub-platforms corresponding to the different areas; and the service sub-platform corresponds to the management sub-platform one by one, and the service sub-platform corresponds to the sensor network sub-platform.

6. The system of claim 4, further comprising an object platform, wherein the management platform is further configured to perform operations including:

obtaining a preset parking time of currently parked vehicle in the candidate parking lot collected by the object platform based on the sensor network platform;

determining a delay time of the current parked vehicle based on a matching relationship between historical parking information and current parking information of the currently parked vehicle;

determining an estimated parking time of the currently parked vehicle based on the preset parking time and the delay time; and determining the free parking space information when the vehicle to be parked arrives at the candidate parking lot based on the estimated parking time of the currently parked vehicle.

\* \* \* \* \*